(12) United States Patent
Yeh et al.

(10) Patent No.: US 8,493,367 B2
(45) Date of Patent: Jul. 23, 2013

(54) INPUTTING DEVICE FOR HANDWRITING SYSTEM

(75) Inventors: Chia-Jui Yeh, Taipei (TW); Hang-Hui Chu, Hsin-Chu (TW)

(73) Assignee: Waltop International Corporation, Hsinchu (TW)

( * ) Notice: Subject to any disclaimer, the term of this patent is extended or adjusted under 35 U.S.C. 154(b) by 483 days.

(21) Appl. No.: 12/651,962

(22) Filed: Jan. 4, 2010

(65) Prior Publication Data

US 2010/0295826 A1    Nov. 25, 2010

(30) Foreign Application Priority Data

May 22, 2009    (TW) .............................. 98117060 A

(51) Int. Cl.
*G06F 3/033* (2013.01)
*G09G 5/00* (2006.01)
*G09G 5/08* (2006.01)

(52) U.S. Cl.
USPC ......... 345/179; 345/173; 345/167; 178/19.01

(58) Field of Classification Search
USPC ................. 345/161, 179, 173, 175, 177, 443, 345/156, 157, 164, 167; 178/18.07, 19.01, 178/18.01, 18.06, 19.07, 20.01; 343/742, 343/867; 463/37; 709/204
See application file for complete search history.

(56) References Cited

U.S. PATENT DOCUMENTS

| | | | | |
|---|---|---|---|---|
| 4,479,032 A * | 10/1984 | Parnell | ......... | 178/19.01 |
| 4,878,553 A * | 11/1989 | Yamanami et al. | ........ | 178/18.07 |
| 6,130,666 A * | 10/2000 | Persidsky | ....................... | 345/179 |
| 6,512,513 B2 * | 1/2003 | Fleck et al. | .................... | 345/179 |
| 6,823,200 B2 * | 11/2004 | Rekimoto et al. | ............ | 455/567 |
| 7,006,074 B2 * | 2/2006 | Chesters | ........................ | 345/156 |
| 7,173,603 B2 * | 2/2007 | Kawasome | .................... | 345/156 |
| 2001/0043185 A1 * | 11/2001 | Fleck et al. | ..................... | 345/94 |
| 2002/0116032 A1 * | 8/2002 | Ferek-Petric | .................... | 607/30 |
| 2004/0037463 A1 * | 2/2004 | Calhoun et al. | ............... | 382/186 |
| 2004/0046732 A1 * | 3/2004 | Chesters | ........................ | 345/156 |
| 2004/0101310 A1 * | 5/2004 | Wang | ............................ | 398/140 |
| 2005/0012716 A1 * | 1/2005 | Mikulin et al. | ................ | 345/163 |
| 2007/0080946 A1 * | 4/2007 | Fyke et al. | ..................... | 345/167 |
| 2008/0023232 A1 * | 1/2008 | Morag et al. | ................ | 178/19.01 |
| 2008/0150918 A1 * | 6/2008 | Hagen et al. | ................... | 345/179 |

OTHER PUBLICATIONS

Thomas, et al., Circuits and Signals: An Introduction to Linear and Interface Circuits, John Wiley and Sons, 1st Ed. 1984, pp. 682-686, specifically p. 685 Fig. C-9(b) enumerator L.*

* cited by examiner

*Primary Examiner* — Quan-Zhen Wang
*Assistant Examiner* — Michael J Eurice
(74) *Attorney, Agent, or Firm* — Huffman Law Group, P.C.

(57) ABSTRACT

An embodiment of the present invention provides a stylus as an inputting device of a handwriting system. The stylus comprises a jog ball, a signal emitting circuit for emitting electromagnetic waves, an resonant circuit for determining the frequencies of the emitting electromagnetic waves, and a button and ball circuit that comprises a pair of sensing units respectively arranged at up and down side of the jog ball for tracking the rolling of the jog ball.

10 Claims, 4 Drawing Sheets

US 8,493,367 B2

INPUTTING DEVICE FOR HANDWRITING SYSTEM

FIELD OF THE INVENTION

The present invention relates to a handwriting system, more particularly, to an inputting device of the handwriting system.

DESCRIPTION OF THE PRIOR ART

The inputting method of a handwriting system, such as a tablet, a digitizer, and a whiteboard, comprises electromagnetic detection and touch detection, and the former method typically employs a stylus as an inputting device of the handwriting system.

Taiwan Patent M2754801 discloses an ergonomically efficient stylus for a handwriting system. Typically this type of stylus comprises a resonant circuit constructed by resistors, inductors, and capacitors. When the tip portion of the stylus contacts a coordinate-detecting surface of the handwriting system, results in the inductance of a coil of the stylus being changed and thus the emitting frequency or resonance frequency of the resonant circuit being changed. The more pressure is exerted on the coordinate-detecting surface, the more inductance is changed of the coil of the stylus. The variation of the emitting frequency or resonance frequency of the resonant circuit depends on the variation of the inductance; therefore the pressure exerted on the coordinate-detecting surface can be calculated by the variation of the emitting or resonance frequency.

However, if a map displayed on the coordinate-detecting surface (or a screen) of the handwriting system is too large to be displayed in its entirety on the coordinate-detecting surface, then the user must use the stylus to move the image of the map to see other portions of the map that are off-screen. For example, the handwriting system is employed for displaying a web page of an Internet Browser by connecting an electronic device, such as a computer, and the web page is too large to be displayed in its entirety on the screen. Although the user can move the web page by touching the left/right and/or up/down scroll bars through the stylus to see other portions of the web page that are off-screen, but this is inconvenience for the user.

Therefore, it would be advantageous to provide a more ergonomically efficiency stylus, which can move the image more conveniently by the user.

SUMMARY OF THE INVENTION

The object of the present invention is to provide a more ergonomically efficiency stylus, which can move the image more conveniently by the user.

According to the object, one embodiment of the present invention provides a stylus as an inputting device of a handwriting system, the stylus comprising a jog ball, a button and circuit comprising a pair of sensing unit respectively arranged near to the upside and downside of the jog ball for detecting the upward and downward movements of the jog ball, a signal emitting circuit for emitting an electromagnetic wave, and a resonant circuit for determining the frequency of the electromagnetic wave.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations and components are not been described in detail in order not to unnecessarily obscure the present invention. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

Figure 1:
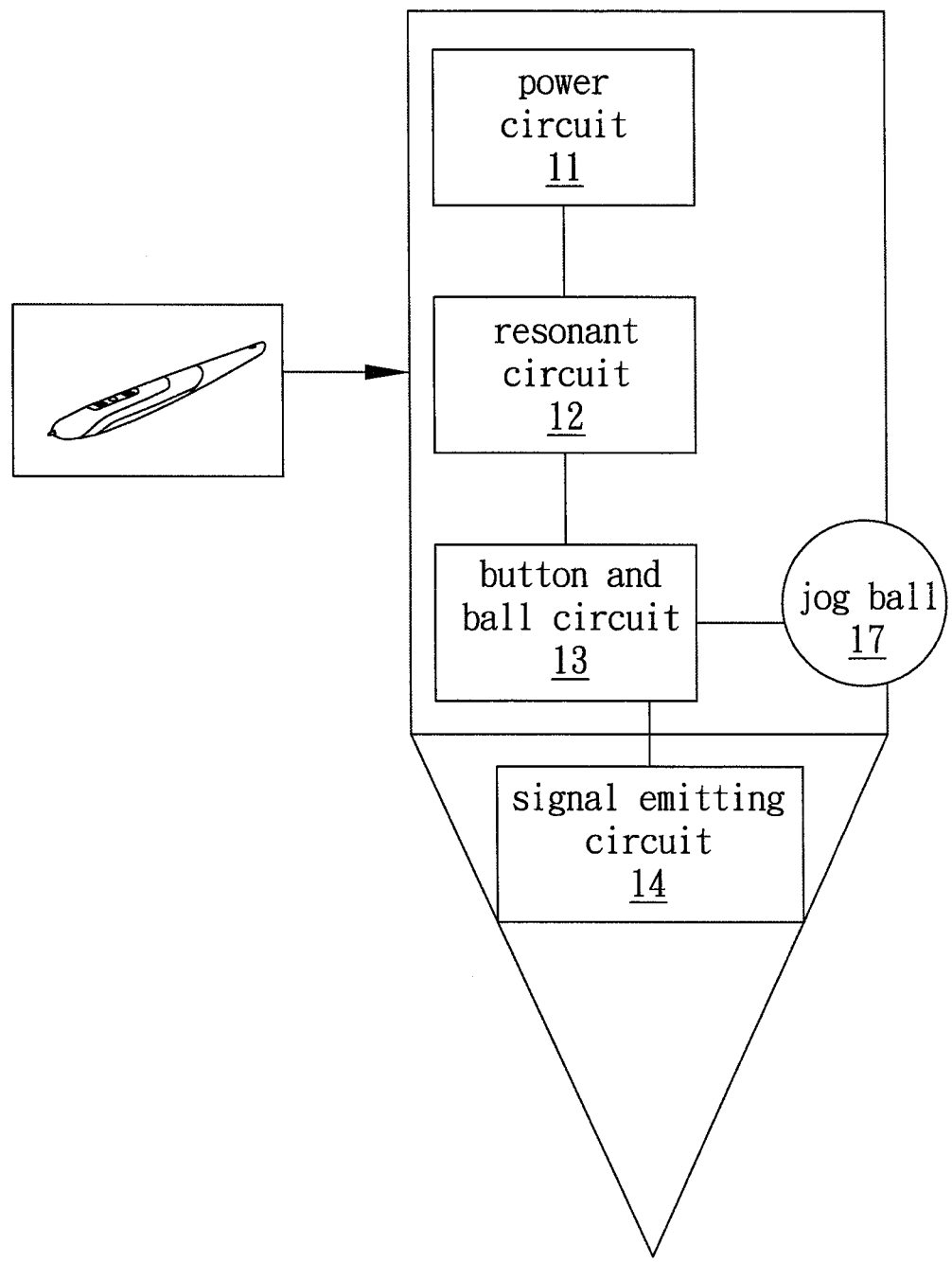
FIG. 1 shows a block diagram of a stylus according to one embodiment of the present invention.

FIG. 1 is a block diagram showing a stylus 10 according to an embodiment of the present invention. The stylus 10 is employed as an inputting device of a handwriting system (not shown), such as a tablet, a digitizer, and a white board. The stylus 10 comprises a power circuit 11, a resonant circuit 12, a button and ball circuit 13, a signal emitting circuit 14, and a jog ball 17. The power circuit 11 is responsible for supplying electricity to the stylus 10. For example, the power circuit 11 comprises one or more batteries for supplying electricity to the stylus. The handwriting system 10 comprises an XY loop antenna array (not shown) for receiving electromagnetic waves having different frequency emitted from the signal emitting circuit 14 of the stylus 10, and the resonant circuit 12 is employed for determining the emitting frequencies of the electromagnetic waves. Jog ball 17 is an auxiliary device to assist in inputting data and may be integrated with one or more specific functions. Jog ball 17 is also referred to as track ball, and the structure and the function of which are well known in the art, and hence the detail description of which is omitted.

Figure 2:
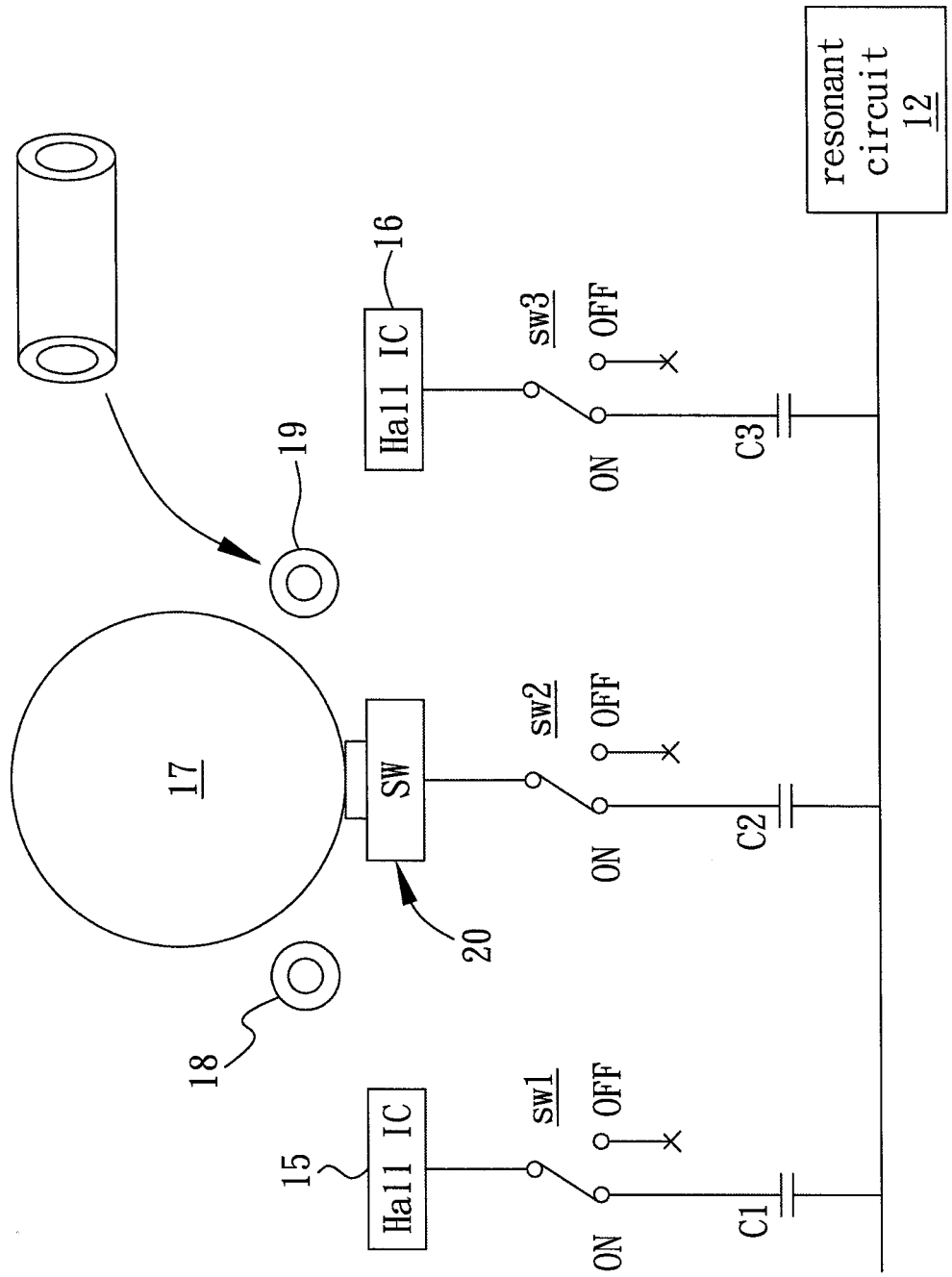
FIG. 2 shows a block diagram of the resonant circuit, the button and ball circuit, and the jog ball shown in FIG. 1.

FIG. 2 illustrates a block diagram of the resonant circuit 12, the button and ball circuit 13, and the jog ball 17 shown in FIG. 1. The button and ball circuit 13 comprises a pair of rollers 18 and 19 arranged near to the upside and downside of the jog ball 17 and in contact with the jog ball 17 when the stylus is stood vertically as the reference direction. In this embodiment the rollers 18 and 19 comprises ring-shaped magnetic material, but this should not be limited. A Hall sensing element (Hall IC) 15 is arranged near to the roller 18 but not in contact with the roller 18; a Hall sensing element 16 is arranged near to the roller 19 but not in contact with the roller 19. Hall sensing element 15 and the roller 18 construct a sensing unit for detecting whether the jog ball 17 is moved upwardly; Hall sensing element 16 and the roller 19 construct another sensing unit for detecting whether the jog ball 17 is moved downwardly. A switch SW1 is connected in series with a capacitor C1 between the Hall sensing element 15 and the resonant circuit 12; a switch SW3 is connected in series with a capacitor C3 between the Hall sensing element 16 and the resonant circuit 12. In addition, as show in FIG. 2, a mechanical switch 20 is arranged below the jog ball 17 when the stylus 10 is lain horizontally as the reference direction and a switch SW2 is connected in series with a capacitor C2 between the mechanical switch 20 and the resonant circuit 12. It is appreciated that the switch SW1, SW2, or SW3 may connect in series with two or more capacitors in parallel. In one embodiment, the switch SW1, SW2, and SW3 are digital switch, but this should not be limited. In another embodiment, the mechanical switch 20, the switch SW2, and the capacitor C2 are omitted.

Figure 3:
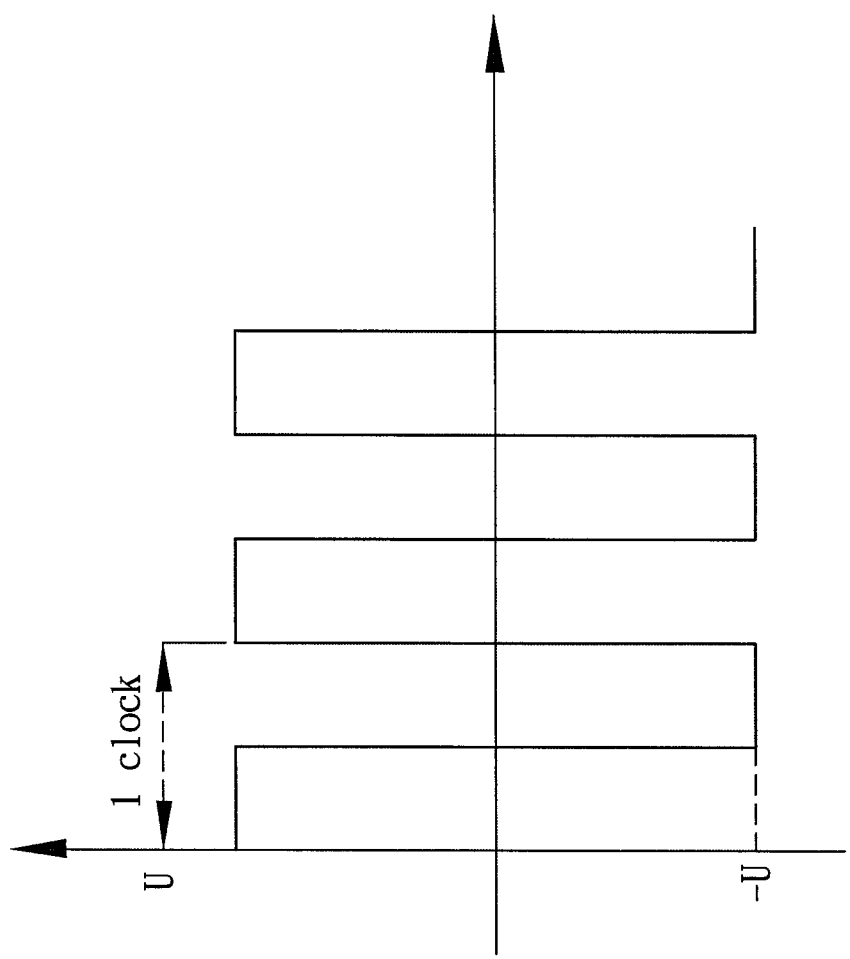
FIG. 3 shows a typical voltage signal outputted from a Hall sensing element according to one embodiment of the present invention.

When the user rolls the jog ball 17, for example, rolling the jog ball 17 upwardly, the roller 18 will be rolled simultaneity. The rolling of the roller 18 varies the magnetic field and Hall sensing element 15 generates voltage signal; a typical voltage signal is exemplarily shown in FIG. 3. Referring to FIG. 3, the voltage signals outputted from Hall sensing element 15 are ranged from −U to U. One voltage signal U and one voltage −U construct one clock. When the job ball 17 rolls one circle, the Hall sensing element 15 outputs a constant number of clocks, and the upward displacement of the jog ball 17 can be calculated accordingly. The same principle also is employed for the case of the jog ball 17 rolling downwardly, the description of which is omitted. In addition, the switch SW1 and SW3 is operated to a "on" or "off" position according to an upper limit voltage. Taking switch SW1 as the example, when the voltage signal outputted from the Hall sensing element 15 is higher than the upper limit voltage, the switch SW1 is operated to the "on" position; otherwise the switch SW1 is operated to the "off" position. For example, when the highest voltage signal outputted from the Hall sensing element is 3.3V, the upper limit voltage may be determined as 2.5V. When the switch SW1 is operated to the "on" position, the capacitor C1 is connected to the resonant circuit 12, resulting in the inductance of the resonant circuit 12 being changed and a specific emitting frequency being determined. Accordingly, the handwriting system is aware that the jog ball 17 is rolled upwardly and moves downwardly the image to a predetermined distance. The same principle is also applied to the case that the jog ball 17 is rolled downwardly. When the jog ball 17 is rolled downwardly, the switch SW3 is operated to the "on" position and the capacitor C3 is connected to the resonant circuit 12, resulting in the inductance of the resonant circuit 12 being changed and a specific emitting frequency being determined. Accordingly, the handwriting system is aware that the jog ball 17 is rolled downwardly and moves upwardly the image to a predetermined distance.

In addition, when the user press the jog ball 17, the mechanical switch 20 triggers the switch SW2 to the "open" position, resulting in the inductance of the resonant circuit 12 being changed and a specific emitting frequency being determined. Accordingly, the handwriting system is aware that the jog ball 17 is pressed and may provide a response to the user. In one embodiment, the user presses the jog ball 17 will trigger an event same as that trigged by the right-click of a typical mouse device.

In the above-mentioned embodiments, when the switch SW1, SW2, or SW3 is operated to the "off" position, the capacitor C1, C2, and C3 will be opened and not be connected to the resonant circuit 12; therefore the inductance of the resonant circuit 12 will not be changed. Moreover, another embodiment of the present invention further comprises (at least) one pair of sensing units (not shown), wherein one sensing unit comprises one roller and one Hall sensing element and this pair of sensing units are employed for detecting the movement of the jog ball 17 in another direction, for example, the left and right movement of the jog ball 17. The structure of this pair of sensing unit may be same as that of FIG. 2, a switch (SW4 and SW5, not shown) being connected in series with a capacitor (C4 and C5, not shown) between the Hall sensing element and the resonant circuit 12. The structure and operation are same as that of FIG. 2; therefore the description of which are omitted.

Further, although the stylus 10 includes the power circuit 11 in the above-mentioned embodiments, it may be omitted in another embodiment. In other words, the jog ball 17 may be applied to a battery-less stylus according to the present invention. The technology of battery-less stylus is well known in the art, the related description of which is omitted.

Figure 4:
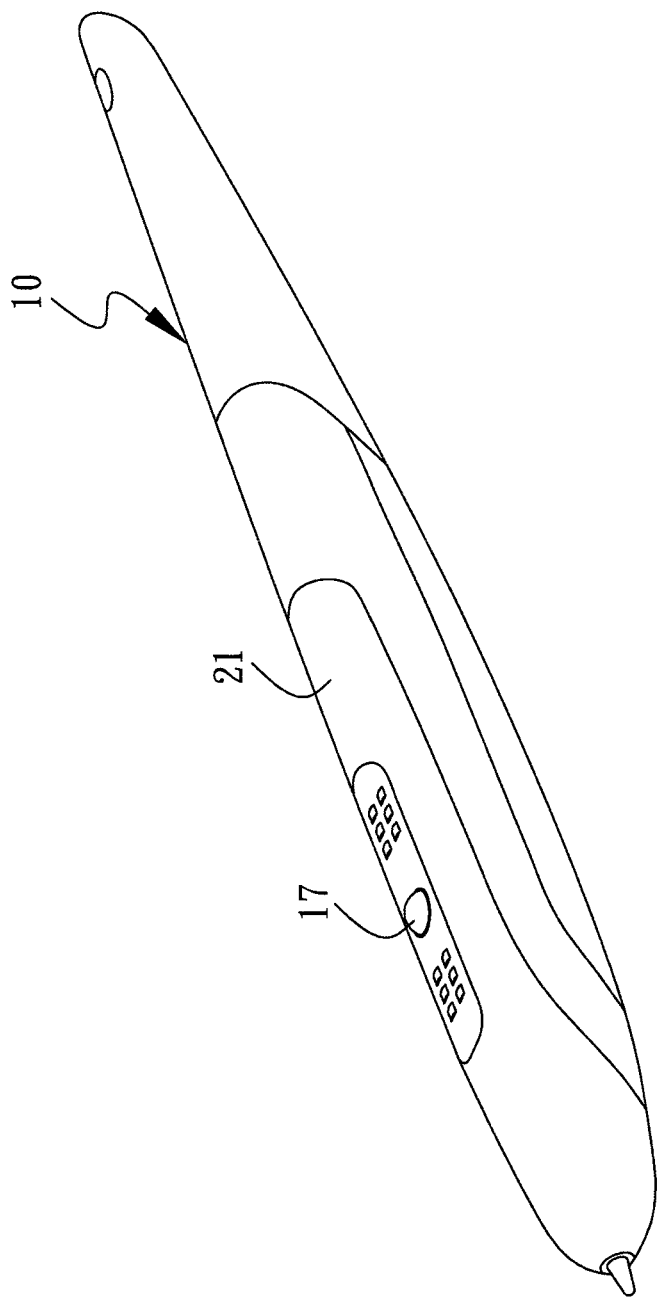
FIG. 4 is a plan view of a stylus according to one embodiment of the present invention.

FIG. 4 shows a plan view of a stylus 10 according to an embodiment of the present invention. The stylus 10 comprises a housing 21. The housing 21 covers the roller (not shown), the Hall sensing element (not shown), and a portion of the jog ball 17; the other portion of the jog ball 17 is exposed. The user can move the image in upward, downward, rightward, and leftward directions by rolling the jog ball 17. For example, when the handwriting system connects to an electronic device such as a computer to display a web page, the up, down, left, and right rolling of the jog ball 17 corresponds to use the up, down, left, and right scroll bars to move the image. In addition, the user pressing the jog ball 17 may result that the handwriting system provides a context menu for the user choosing.

Although specific embodiments have been illustrated and described, it will be appreciated by those skilled in the art that various modifications may be made without departing from the scope of the present invention, which is intended to be limited solely by the appended claims.

What is claimed is:

1. A stylus used as an inputting device of a handwriting system, comprising:
    a jog ball arranged at a side of said stylus;
    a button-and-ball circuit, comprising:
        a first pair of sensing units respectively arranged near to the upside and downside of said jog ball, for tracking the upward and downward movements of said jog ball, wherein each sensing unit comprises a first roller, a first Hall sensing element, a first switch comprising an input terminal, an ON terminal, and an OFF terminal, and a first capacitor comprising an input terminal and an output terminal, in which said first roller is a hollow cylindrical magnet, said first roller contacts with said jog ball, said first Hall sensing element is arranged near to said first roller but not in contact with said first roller, said first Hall sensing element is coupled to the input terminal of said first switch, said ON terminal of said first switch is coupled to said input terminal of said first capacitor, and said output terminal of said first capacitor is coupled to said resonant circuit;
    a second pair of sensing units respectively arranged near the left and right side of said jog ball for detecting the left and right movements of said jog ball, wherein each of the second pair of sensing units comprises a second roller, a second Hall sensing element, a second switch comprising an input terminal, an ON terminal, and an OFF terminal, and a second capacitor comprising an input terminal and an output terminal, in which said second roller is a hollow cylindrical magnet, said second roller contacts with said jog ball, said second Hall sensing element is arranged near to said second roller but not in contact with said second roller, said second Hall sensing element is coupled to the input terminal of said second switch, said ON terminal of said second switch is coupled to said input terminal of said second capacitor, and said output terminal of said second capacitor is coupled to said resonant circuit; and a mechanical switch arranged below said jog ball, a third switch with an input terminal, an ON terminal, and an OFF terminal, and a third capacitor with an input terminal and an output terminal, in which the input terminal of said third switch is coupled to said mechanical switch, and the ON terminal of said third switch is coupled to the input terminal of said third capacitor, and the output terminal of said third capacitor is coupled to said resonant circuit;

a signal emitting circuit, for emitting an electromagnetic wave; and a resonant circuit, for determining the frequency of the electromagnetic wave;

wherein when said jog ball is not rolled, said first switch is switched to said OFF terminal, and when said jog ball is rolled upward or downward, said first roller is rolled as well and said first Hall sensing element generates a first voltage to switch said first switch to said ON terminal, so as to change the circuit capacitance of said resonant circuit;

wherein when said jog ball is not rolled, said second switch is switched to said OFF terminal, and when said jog ball is rolled left or right, said second roller is rolled as well and said second Hall sensing element generates a second voltage to switch said second switch to said ON terminal, so as to change the circuit capacitance of said resonant circuit; and wherein when said jog ball is not pressed, said third switch is switched to said OFF terminal, and when said jog ball is pressed, the mechanical switch triggers said third switch to said ON terminal, resulting a voltage being supplied to said third capacitor, so as to change the circuit capacitance of said resonant circuit.

2. The stylus as recited in claim 1, wherein said first switch comprises a digital switch.

3. The stylus as recited in claim 1, wherein said second switch comprises a digital switch.

4. The stylus as recited in claim 1, wherein said third switch comprises a digital switch.

5. The stylus as recited in claim 1, wherein said handwriting system comprises a Tablet, a Digitizer, or a White Board.

6. The stylus as recited in claim 1, wherein said handwriting system connects to an electronic device for displaying a web page, and the rolling movements of said jog ball in up, down, left, and right directions are corresponding to using the up, down, left, and right directions scroll bars of the web page.

7. The stylus as recited in claim 1, wherein said stylus further comprises a power circuit for supplying electricity to said stylus.

8. The stylus as recited in claim 7, wherein said power circuit comprises a battery.

9. The stylus as recited in claim 1, wherein when the user presses said jog ball, said handwriting system provides an event to the user.

10. The stylus as recited in claim 9, wherein the event comprises a context menu for the user choosing.

* * * * *